United States Patent Office 3,166,570
Patented Jan. 19, 1965

3,166,570
DERIVATIVES OF BENZO[e]ISOINDOLINE AND THEIR PREPARATION
Stanley O. Winthrop, Montreal, Quebec, Canada, assignor to American Home Products Corporation, New York, N.Y., a corporation of Delaware
No Drawing. Filed Feb. 15, 1963, Ser. No. 258,915
3 Claims. (Cl. 260—319)

This invention relates to certain new chemical compounds, novel derivatives of benzo[e]isoindoline, and to the process by which they may be prepared.

More particularly, my invention relates to the new pharmacologically-active chemical compound 5-phenyl-2-methyl-3a,4,5,9b-tetrahydrobenzo[e]isoindoline, and to a process by which this compound may be prepared from available starting materials. It is also concerned with a novel intermediate, a new chemical compound also, which is secured in the course of this process of preparation.

The new pharmacologically-active chemical compound, 5-phenyl-2 - methyl - 3a,4,5,9b - tetrahydrobenzo[e]isoindoline may also be converted to salts thereof, and my invention also includes salts of this base with pharmacologically-acceptable, non-toxic acids, both inorganic acids and organic acids. As an example thereof, the hydrochloride salt of the compound 5-phenyl-2-methyl-3a,4,5,9b-tetrahydrobenzo[e]isoindoline may be given.

My new chemical compound, 5 - phenyl - 2 - methyl-3a,4,5,9b-tetrahydrobenzo[e]isoindoline, as well as salts thereof of the type previously specified, exhibit a spectrum of pharmacological properties characteristic of tranquilizers and antidepressant drugs. Thus, for example, this compound potentiates ethyl alcohol narcosis; protects against convulsions induced by electroshock; decreases motor activity; and elicits behavioral effects at doses well below those causing neurotoxicity. The compound, whether in base or salt form, also possesses antichlorinergic and antihistaminic activities. In use it may be administered either orally or by injection, and may be combined with, or dissolved in, various excipients, diluents or solid carriers.

As starting material in the preparation of my new, pharmacologically-active chemical compound, it is preferred to use 1-phenyl-1,2,3,4-tetrahydronaphthalene-3,4-dicarboxylic acid. This is a known chemical compound which is described in the chemical literature, for example in Berichte, volume 63, page 3223 (1930).

In accordance with a preferred method of procedure, 1-phenyl-1,2,3,4-tetrahydronaphthalene - 3,4 - dicarboxylic acid is caused to react with methylamine in order to form the intermediate compound, 5-phenyl-2-methyl-1,3-diketo-3a,4,5,9b-tetrahydrobenzo[e]isoindoline. This is preferably accomplished by bringing the two together at an elevated temperature, i.e. one in excess of about 200° C., and maintaining the two compounds in contact for a period of time sufficient to insure substantial completion of the reaction. Ethanol or some other solvent for the product may then be added in order to assist in its recovery. The intermediate compound is a solid which may be purified by solution in, and crystallization from, a solvent therefor, such as ethanol.

The intermediate product, 5-phenyl-2-methyl-1,3-diketo-3a,4,5,9b-tetrahydrobenzo[e]isoindoline, is then reduced by the action of lithium aluminum hydride to give the desired, pharmacologically - active product, 5 - phenyl - 2 - methyl-3a,4,5,-9b-tetrahydrobenzo[e]isoindoline.

This reaction may advantageously be carried out in an inert solvent, such as tetrahydrofuran, the reaction mixture being heated at reflux for a sufficiently long period of time to insure substantial completion of the reaction. The reaction mixture, as well as excess lithium aluminum hydride, may then be hydrolyzed, the aluminum hydroxide removed, and the solvent or diluent taken off, preferably by distillation. The new compound, 5-phenyl-2-methyl-3a,4,5,9b-tetrahydrobenzo[e]isoindoline, may be recovered as an oily product.

Salts of this base compound, such as the hydrochloride salt, may be prepared by treatment thereof with an aqueous acid, such as with hydrochloric acid. The pure free base may then be recovered from the hydrochloride salt by treatment of the latter with an aqueous solution of a weak base, such as aqueous sodium carbonate solution, followed by distillation off of 5-phenyl-2-methyl-3a,4,5,9b-tetrahydrobenzo[e]isoindoline, which is recovered as an oily product.

The chemical reactions occurring may be represented as follows:

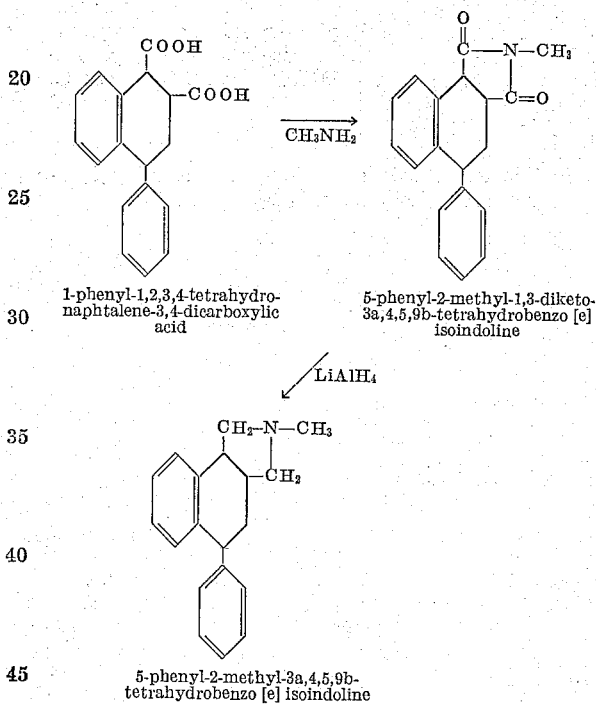

The following illustrative examples give further details as to my new chemical compounds and the process used in their preparation.

EXAMPLE 1

*5-phenyl-2-methyl-1,3-diketo-3a,4,5,9b-tetrahydrobenzo[e]isoindoline*

The compound 1-phenyl-1,2,3,4-tetrahydronaphthalene-3,4-dicarboxylic acid (15 g., 0.05 M) was dissolved in 92 g. of 25% aqueous methylamine (15.5 g., 0.5 M). The solution was gradually warmed to 225° C. and held at this temperature for 5 hours. After cooling, ethanol (250 ml.) was added and the residue was loosened by heating at reflux for ten minutes. The solid was filtered off, the ethanol distilled, and the residue combined with the original solid to yield 14 g. of product (96% yield), M.P. 170–175° C. Two recrystallizations from ethanol raised the melting point to 181–182° C.

Analysis confirmed the empiric formula $C_{19}H_{17}NO_2$ for 5-phenyl - 2 - methyl - 1,3 - diketo - 3a,4,5,9b - tetrahydrobenzo[e]isoindoline.

Required: C, 78.33; H, 5.88; N, 4.81. Found: C, 78.14; H, 5.94; N, 4.84.

EXAMPLE 2

*5-phenyl-2-methyl-3a,4,5,9b-tetrahydrobenzo[e]isoindoline*

5-phenyl-2-methyl-1,3-diketo-3a,4,5,9b-tetrahydrobenzo[e]isoindoline (18 g., 0.062 M), lithium aluminum hydride (7 g., 0.186 M) and 400 ml. of tetrahydrofuran were heated to reflux for 24 hours. The complex and excess hydride were then carefully hydrolyzed with 50 ml. of water, the aluminum hydroxide removed and the tetrahydrofuran distilled off.

The crude residue was taken up in ether. Some ether-insoluble material was set aside. The ether extract was treated with hydrogen chloride, causing an oil to precipitate. This was taken up in water and the ether solution further extracted with water. The aqueous acid washings were neutralized and the precipitated oil taken up in ether. On drying and evaporating off the ether, 7.5 g. of an oil product resulted.

This product, 5-phenyl-2-methyl-3a,4,5,9b-tetrahydrobenzo[e]isoindoline, was then converted in the usual manner to a hydrochloride salt, yielding 7.5 g. of amorphous product, M.P. 140–160° C. It was crystalized by triturating in warm acetone to yield 5.4 g., M.P. 216–216° C. (dec.). Two recrystallizations from isopropanol raised the melting point to 221–223° C. (dec.).

Analysis confirmed the empiric formula $C_{19}H_{22}NCl$ for the hydrochloride salt of 5-phenyl-2-methyl-3a,4,5,9b-tetrahydrobenzo[e]isoindoline.

Required: C, 76.10; H, 7.38; N, 4.67; Cl, 11.82. Found: C, 76.13; H, 7.36; N, 4.70; Cl, 12.08.

The pure free base, 5-phenyl-2-methyl-3a,4,5,9b-tetrahydrobenzo[e]isoindoline, was liberated from the hydrochloride salt by suitable treatment with aqueous sodium carbonate and distilled at 148° C. at 0.07 mm. of mercury pressure.

Analysis confirmed the empiric formula $C_{19}H_{21}N$ for the free base, 5-phenyl-2-methyl-3a,4,5,9b-tetrahydrobenzo[e]isoindoline.

Required: C, 86.64; H, 8.04. Found: C, 85.98; H, 8.55.

I claim:

1. A compound selected from the group which consists of 5-phenyl-2-methyl-3a,4,5,9b-tetrahydrobenzo[e]isoindoline and the hydrochloride salt thereof.
2. 5-phenyl-2-methyl-3a,4,5,9b-tetrayhdrobenzo[e]isoindoline.
3. 5-phenyl-2-methyl-3a,4,5,9b-tetrahydrobenzo[e]isoindoline hydrochloride.

References Cited in the file of this patent

FOREIGN PATENTS 33,165   Great Britain _____ Apr. 21, 1960

OTHER REFERENCES

Rice et al.: J. Org. Chem., vol. 19, pp. 884–892 (1954).
Furdik et al.: Chemicke Zvesti, vol. 15, No. 3, pp. 173–180 (1961).

UNITED STATES PATENT OFFICE
CERTIFICATE OF CORRECTION

Patent No. 3,166,570 January 19, 1965

Stanley O. Winthrop

It is hereby certified that error appears in the above numbered patent requiring correction and that the said Letters Patent should read as corrected below.

Column 3, line 24, for "M.P. 216-216° C." read -- M.P. 215-216° C. --.

Signed and sealed this 10th day of August 1965.

(SEAL)
Attest:

ERNEST W. SWIDER
Attesting Officer

EDWARD J. BRENNER
Commissioner of Patents